(12) United States Patent
Taylor et al.

(10) Patent No.: US 10,522,030 B2
(45) Date of Patent: Dec. 31, 2019

(54) SYSTEM AND METHOD FOR AUTOMATICALLY TRANSMITTING FLOORPLAN

(71) Applicants: Lorren Travis Taylor, Belton, MO (US); Deborah J. Taylor, Belton, MO (US)

(72) Inventors: Lorren Travis Taylor, Belton, MO (US); Deborah J. Taylor, Belton, MO (US)

( * ) Notice: Subject to any disclaimer, the term of this patent is extended or adjusted under 35 U.S.C. 154(b) by 0 days.

(21) Appl. No.: 16/169,258

(22) Filed: Oct. 24, 2018

(65) Prior Publication Data
US 2019/0139398 A1 May 9, 2019

Related U.S. Application Data

(60) Provisional application No. 62/581,348, filed on Nov. 3, 2017.

(51) Int. Cl.
| | |
|---|---|
| *G08B 21/00* | (2006.01) |
| *G08B 27/00* | (2006.01) |
| *G01C 21/20* | (2006.01) |
| *H04W 4/02* | (2018.01) |
| *G08B 21/02* | (2006.01) |
| *G06F 16/29* | (2019.01) |

(52) U.S. Cl.
CPC ......... *G08B 27/001* (2013.01); *G01C 21/206* (2013.01); *G06F 16/29* (2019.01); *G08B 21/02* (2013.01); *H04W 4/025* (2013.01)

(58) Field of Classification Search
CPC .... G08B 27/001; G08B 21/02; G08B 25/016; G06F 16/29; H04W 4/025; H04W 4/90; H04W 4/029; H04W 4/33; H04W 4/021; G01C 21/206; G06Q 50/265
USPC .... 340/540, 539.13, 286.05, 286.06, 539.11; 455/404.1, 404.2, 456.1, 521
See application file for complete search history.

(56) References Cited

U.S. PATENT DOCUMENTS

| | | | |
|---|---|---|---|
| 6,665,004 B1 * | 12/2003 | Paff | G08B 13/19645 348/156 |
| 8,204,473 B2 | 6/2012 | Mathis et al. | |

(Continued)

FOREIGN PATENT DOCUMENTS

WO 2009105603 A1 8/2009

*Primary Examiner* — Anh V La
(74) *Attorney, Agent, or Firm* — Poisineili PC

(57) ABSTRACT

A system includes at least one processor to receive an emergency request from a first client computing device that indicates that a first responder is to be dispatched to a particular physical address, transmit the floorplan associated with the particular physical address to a second client computing device associated with the first responder, request a confirmation of the emergency request from the first client computing device and receive the confirmation of the emergency request from the first client computing device, and determine that the second computing device is within a particular distance from the particular physical address and display on a display of the second client computing device a location of a person in a particular space of the floorplan at the particular physical address, the location of the person in the particular space of the floorplan at the particular physical address obtained from the first client computing device.

17 Claims, 9 Drawing Sheets

(56) References Cited

U.S. PATENT DOCUMENTS

| | | | |
|---|---|---|---|
| 9,489,825 B1 * | 11/2016 | McDonnell | G08B 27/001 |
| 9,980,112 B1 * | 5/2018 | Newby | H04W 4/90 |
| 2008/0122609 A1 | 5/2008 | Mannisto et al. | |
| 2009/0284348 A1 | 11/2009 | Pfeffer | |
| 2009/0319180 A1 | 12/2009 | Robinson et al. | |
| 2010/0061526 A1 | 3/2010 | Blatchley et al. | |
| 2014/0364081 A1 | 12/2014 | Rauner | |
| 2015/0288469 A1 | 10/2015 | Shoemaker | |
| 2016/0049064 A1 | 2/2016 | McNabb et al. | |
| 2016/0119424 A1 | 4/2016 | Kane et al. | |
| 2017/0278378 A1 * | 9/2017 | Kaplita | H04W 4/90 |
| 2018/0144613 A1 * | 5/2018 | Ali-Jarad | G08B 27/001 |

* cited by examiner

SYSTEM AND METHOD FOR AUTOMATICALLY TRANSMITTING FLOORPLAN

CROSS-REFERENCE TO RELATED APPLICATIONS

This application is related to and claims priority under 35 U.S.C. § 119(e) to U.S. Patent Application No. 62/581,348, filed Nov. 3, 2017, entitled "Floorplans Electronically Transmitted to First Responders," the entire contents of which are incorporated herein by reference.

BACKGROUND

Conventionally, the process of acquiring and conveying information to first responders or emergency responders is performed after receiving a distress signal from a person in need of help from an emergency responder. Because time is of the essence, this can lead to catastrophic issues such as an emergency responder not knowing a location of the person in need of help until it is too late. Although an emergency responder may know an address associated with a call for assistance, the emergency responder may not know where the person is specifically located at the address. A building may have many different rooms or floors and the emergency responder may not have enough information in order to locate the person. The emergency responder may have to search the building or try to find the information from another source when they could be spending this time assisting the person in need of help. Unfortunately, first responses can only assume a layout of a structure and may be guessing as to where a person or animal may be located.

It is with these issues in mind, among others, that various aspects of the disclosure were conceived.

SUMMARY

According to one aspect, a system for automatically transmitting a floorplan to a computing device is provided herein. The system obtains and aggregates floorplans for buildings and additional metadata and information associated with the buildings before receiving emergency notifications from users in need of an urgent response from a first responder. When an emergency notification is received, the system may automatically disseminate the floorplan and additional metadata and information to the first responder. This may save vital moments when time is of the essence. In many instances, the first responder may know that the person is located at an address, but may not know where the person is specifically located at the address, such as a particular room of a building. Conventionally, the emergency responder may have had to search the building to find the person and provide aid. This could lead to delays and catastrophic results. According to exemplary embodiments, the system may automatically expedite the dissemination of this important information without the first responder having to request this information from a dispatcher or another source.

When a user sends an emergency notification to a server computing device, the server computing device may automatically send a floorplan and the metadata and information to a client computing device, e.g., a mobile computing device, associated with a first responder. As a result, the first responder may automatically receive a floorplan associated with a building and may know a specific location of the user, e.g., suite B on the third floor of an office building or a specific bedroom on the second floor of a residence. In addition, the first responder may also automatically receive a name, an age, and other information of a person in need of assistance. As an example, upon arrival at the location of the building, the client computing device may display a user interface that shows a floorplan of the building and a specific location and other information associated with the person in need of assistance overlaid on the floorplan. The specific location and other information may be based on a location of a client computing device of the person.

The additional information also may include and/or be based on images associated with an exterior and/or an interior of the building. The exterior images of the building may be images captured from a street view perspective or the images of the building may be images captured from a satellite view perspective. Alternatively, the images may be captured on an interior of the building and may include one or more images associated with one or more rooms, suites, or subsets of the interior of the building. As an example, each room of a residence may be captured by a camera or imaging device. In one embodiment, the images may be captured and uploaded by a homeowner, a renter, a building manager, or another party associated with the building. Images may be photographs, floorplans, and/or maps.

According to an aspect, the system includes a memory and at least one processor to execute instructions stored in the memory to perform operations comprising receiving a floorplan of a building and storing the floorplan in a database, receiving an emergency request from a first client computing device that indicates that a first responder is to be dispatched to a particular physical address associated with the building, transmitting the floorplan associated with the particular physical address to a second client computing device associated with the first responder, when the second client computing device is connected to a communication network, receiving a notification that the floorplan associated with the particular physical address is stored in memory of the second client computing device, requesting a confirmation of the emergency request from the first client computing device and receiving the confirmation of the emergency request from the first client computing device, and determining that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

According to another aspect, a method includes receiving, by at least one processor, a floorplan of a building and storing the floorplan in a database, receiving, by the at least one processor, an emergency request from a first client computing device that indicates that a first responder is to be dispatched to a particular physical address associated with the building, transmitting, by the at least one processor, the floorplan associated with the particular physical address to a second client computing device associated with the first responder, when the second client computing device is connected to a communication network, receiving, by the at least one processor, a notification that the floorplan associated with the particular physical address is stored in memory of the second client computing device, requesting, by the at least one processor, a confirmation of the emergency request from the first client computing device and receiving the confirmation of the emergency request from the first client computing device, and determining, by the at least one processor, that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

According to an additional aspect, a non-transitory computer-readable storage medium includes instructions stored thereon that, when executed by a computing device cause the computing device to perform operations, the operations including receiving a floorplan of a building and storing the floorplan in a database, receiving an emergency request from a first client computing device that indicates that a first responder is to be dispatched to a particular physical address associated with the building, transmitting, by the at least one processor, the floorplan associated with the particular physical address to a second client computing device associated with the first responder, when the second client computing device is connected to a communication network, receiving, by the at least one processor, a notification that the floorplan associated with the particular physical address is stored in memory of the second client computing device, requesting, by the at least one processor, a confirmation of the emergency request from the first client computing device and receiving the confirmation of the emergency request from the first client computing device, and determining, by the at least one processor, that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Aspects of a system and method for transmitting a floorplan provide a server computing device that receives a floorplan of a building in response to a request and stores the floorplan of the building in a database. The server computing device may then later receive an emergency request from a first client computing device that indicates that a first responder is to be dispatched to a particular physical address. The server computing device may transmit the floorplan associated with the particular physical address to a second client computing device associated with the first responder. When the second client computing device is connected to a communications network, the second client computing device may receive and store the floorplan associated with the particular physical address. The server computing device may request a confirmation of the emergency request from the first client computing device and receive the confirmation of the emergency request from the first client computing device. The first responder may travel to the particular physical address in possession of the second client computing device.

At this point, the server computing device may determine that the second client computing device is within a particular distance of the particular physical address and the second client computing device may display a user interface on a display that shows a location of a person in a particular space of the floorplan at the particular physical address. As an example, the user interface may indicate that the person is located in a second floor bedroom on the floorplan of the building.

A user interface element representing the person may be overlaid on the floorplan at the location of the person. In addition, other information may also be overlaid on the floorplan such as a name of each room or space in the floorplan, a name of a person that lives in the room or space, an age of the person that lives in the room or space, and other information associated with the person that lives in the room or space such as a medical condition. The particular space may be a room in the building on the floorplan, such as a second story bedroom. The location of the person in the particular space of the floorplan at the particular physical address also may be obtained from the first client computing device 104.

Figure 1:
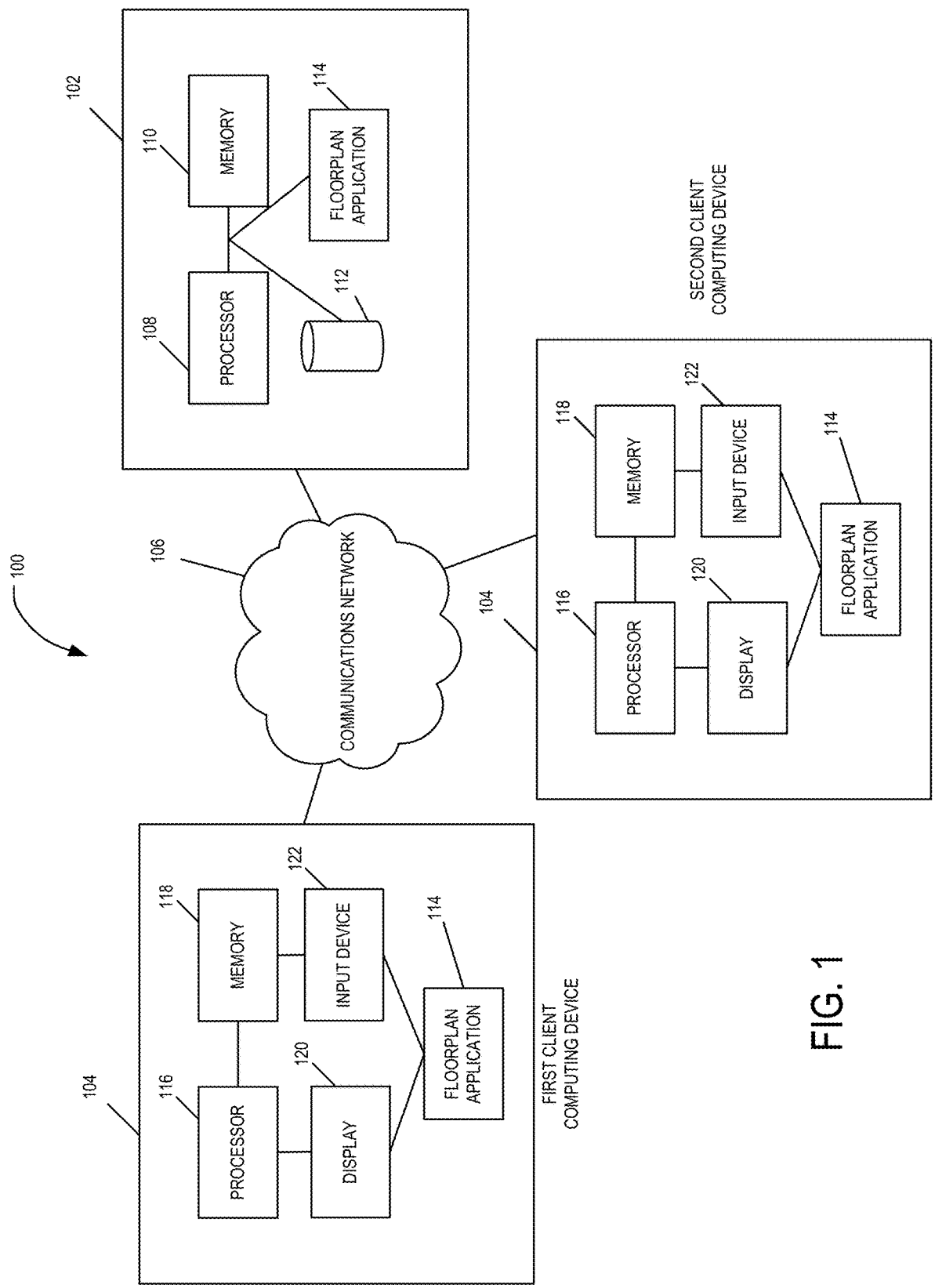
FIG. 1 is a block diagram of a system for automatically transmitting a floorplan according to an example embodiment.

FIG. 1 shows a block diagram of a computing system comprising a system for automatically transmitting a floorplan 100 according to an example embodiment.

The system for transmitting a floorplan 100 includes at least one server computing device 102 having a floorplan application 114 that is in communication with at least one client computing device 104 via a communication network 106. The system for transmitting a floorplan 100 may also include a relational database management system (RDBMS) or another type of database management system that stores and communicates data from at least one database 112. The data stored in the at least one database 112 may be user registration information associated with a plurality of users of the system 100 including user identifiers such as telephone numbers or hardware identifiers and physical addresses associated with the users, floorplan information associated with a plurality of buildings, image information associated with the plurality of buildings, and first responder information such as contact information for first responders, among other data.

The at least one server computing device 102 is configured to receive data from and/or transmit data to the at least one client computing device 104 through the communication network 106. Although the at least one server computing device 102 is shown as a single server, it is contemplated that the at least one server computing device 102 may include multiple servers, for example, in a cloud computing configuration. Additionally, the at least one server computing device 102 is configured to receive data and/or transmit data to the at least one client computing device 104 through the communication network 106.

The communication network 106 can be the Internet, an intranet, or another wired or wireless communication network. For example, the communication network 110 may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, or an IEEE 802.11 standards network, as well as various communications thereof. Other conventional and/or later developed wired and wireless networks may also be used.

The at least one server computing device 102 includes at least one processor 108 to process data and memory 110 to store data. The processor 108 processes communications, builds communications, retrieves data from memory 110, and stores data to memory 110. The processor 108 and the memory 110 are hardware. The memory 110 may include volatile and/or non-volatile memory, e.g., a computer-readable storage medium such as a cache, random access memory (RAM), read only memory (ROM), flash memory, or other memory to store data and/or computer-readable executable instructions such as a portion or component of the floorplan application 114. In addition, the at least one server computing device 102 further includes at least one communications interface to transmit and receive communications, messages, and/or signals.

The at least one client computing device 104 includes at least one processor 116 to process data and memory 118 to store data. The processor 116 processes communications, builds communications, retrieves data from memory 118, and stores data to memory 118. The processor 116 and the memory 118 are hardware. The memory 118 may include volatile and/or non-volatile memory, e.g., a computer-readable storage medium such as a cache, random access memory (RAM), read only memory (ROM), flash memory, or other memory to store data and/or computer-readable executable instructions such as a portion or a component of the floorplan application 114 displayed and executed by the client computing device 104. In addition, the at least one client computing device 104 further includes at least one communications interface to transmit and receive communications, messages, and/or signals.

The at least one client computing device 104 can be a laptop computer, a smartphone, a personal digital assistant, a tablet computer, a standard personal computer, or another processing device. The at least one client computing device 104 may include a display 120, such as a computer monitor, for displaying data and/or graphical user interfaces. The at least one client computing device 104 may also include an input device 122, such as a camera, a keyboard or a pointing device (e.g., a mouse, trackball, pen, or touch screen) to enter data into or interact with graphical and/or other types of user interfaces. In an exemplary embodiment, the display 120 and the input device 122 may be incorporated together as a touch screen of the smartphone or tablet computer.

The at least one client computing device 104 may display on the display 120 a graphical user interface (or GUI). The graphical user interface may be provided by the floorplan application 114, which may be transmitted from the server computing device 102. The graphical user interface enables a user of the at least one client computing device 104 to interact with the at least one server computing device 102 and the floorplan application 114.

The floorplan application 114 may be a component of an application and/or service executable by the at least one client computing device 104 and/or the at least one server computing device 102. For example, the floorplan application 114 may be a single unit of deployable executable code or a plurality of units of deployable executable code. According to one aspect, the floorplan application 114 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

In one example, the at least one client computing device 104 may include a first client computing device associated with a first user. The first user may be a person in distress and seeking assistance from a first responder such as a member of a police department, a member of a fire department, and emergency responders from a hospital or urgent care unit. The first responder may be a person that may be one of the first to arrive and provide assistance at the scene of an incident as requested by the first user in the event of an emergency such as an accident, a natural disaster, or an attack. The first responder may be an individual responsible for the protection and preservation of life, property, evidence, and the environment such as federal, state, and local governmental and nongovernmental emergency public safety, fire, law enforcement, emergency response, emergency medical services providers, and related personnel, agencies, and authorities.

The first responder may be one of an emergency medical responder, a police officer, a paramedic, a fire fighter, a campus police officer, a lifeguard, a marine patrol officer, a ski patrol member, a park ranger, a first aid provider, a security guard, an emergency management person, a HAZMAT responder, a community emergency response team member, a wilderness first responder, and others. The at least one client computing device 104 also may include a second client computing device associated with a second user such as the first responder or another user associated with the first responder.

Figure 2:
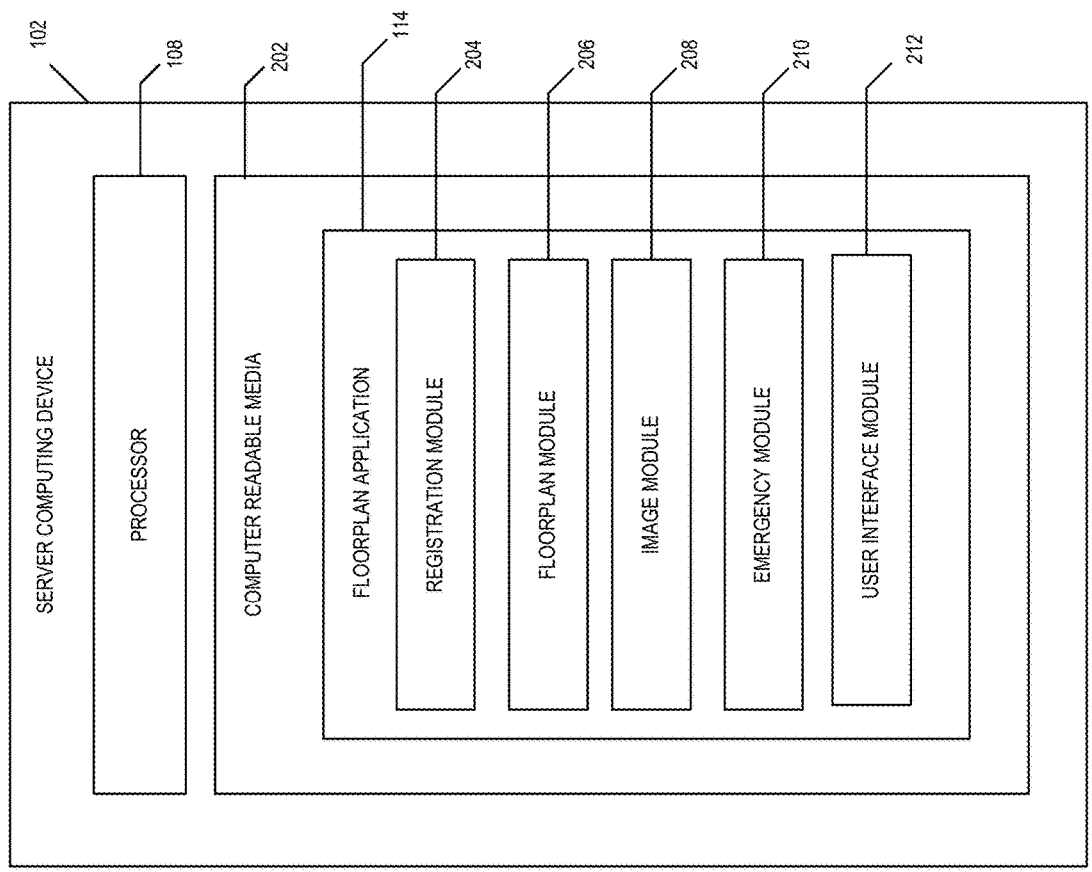
FIG. 2 shows a block diagram of a server computing device of the system according to an example embodiment.

FIG. 2 illustrates a block diagram of the server computing device 102 according to an example embodiment. The server computing device 102 includes computer readable media (CRM) 202 in memory on which the floorplan application 114 or other user interface or application is stored. The computer readable media may include volatile media, nonvolatile media, removable media, non-removable media, and/or another available medium that can be accessed by the processor 108. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The floorplan application 114 includes a registration module 204 for registering a user with the floorplan application 114. As an example, the user may send a request to create an account with the floorplan application 114 in order to share information with the floorplan application 114 so that the user may receive expedited deployment of first responders to a building and a physical address associated with the user. As an example, the user may send information such as a name, e.g., Steve Smith, and one or more telephone numbers or another unique identifier to the server computing device 102 that provides a way to uniquely identify the user, e.g., a MAC address of the first client computing device 104 or an identifier associated with the hardware of the first client computing device 104 may be automatically determined by the registration module 204 or received by the registration module 204. As an example, the user may send a phone number, e.g., 111-222-3333. The user also may provide physical address information of a building of the user, e.g., an address of a home of the user or an office building of the user such as 123 Main St. Anytown Mo. 12345.

When the floorplan application 114 determines that an emergency request is received from telephone number 111-222-3333, the floorplan application 114 may determine the floorplan associated with the user. Alternatively, the floorplan application 114 may determine that the emergency request is received from a client computing device having hardware identifier ABCDE. The floorplan application 114 may determine the floorplan associated with the user based on the hardware identifier.

In response to the request to create an account, the server computing device 102 may obtain a floorplan associated with the physical address or alternatively, if known and available, the user may submit a floorplan to the server computing device 102. This floorplan may identify one or more spaces associated with the building such as one or more floors associated with the building, one or more rooms associated with the building, one or more suites associated with the building, and other particular subsets/zones associated with the building.

In addition, the registration module 204 may also register a first responder with the floorplan application. The first responder may send a request to create an account with the floorplan application 114 in order to receive emergency notification information from the floorplan application 114. The first responder may provide information such as a name of the first responder, e.g., Samuel A. Policemun, an employer, e.g., Anytown Police Department, a particular location of service, e.g., eastern Anytown, or precinct fifteen, and other information. In addition, the first responder may provide unique identifying information associated with the second client computing device such as a telephone number or another unique identifier, e.g., a MAC address of the second client computing device 104 or an identifier associated with the hardware of the second client computing device 104.

In addition, the floorplan application 114 includes a floorplan module 206. The floorplan module 206 may obtain the floorplan from the user or may automatically retrieve the floorplan from another server computing device or from resources available via the communication network 106 when the user creates the account with the floorplan application 114. This floorplan may identify one or more spaces associated with the building such as one or more floors associated with the building, one or more rooms associated with the building, one or more suites associated with the building, and other particular building subsections/subsets/subdivisions associated with the building.

In one example, the floorplan may be an image file or a portable document format (PDF) file. In another example, the floorplan may be represented using an XML file, a JSON file, or a CSV file. The floorplan module 206 may also obtain blueprint information associated with the floorplan and other information and may store the floorplan and the blueprint information in the database 112.

The floorplan module 206 may perform image analysis or digital image processing on the floorplan if the floorplan is an image file to extract properties associated with the building such as spaces, zones, rooms, suites, floors, or subsections/subsets/subdivisions associated with the building. Alternatively, the floorplan module 206 may parse the XML file, the JSON file, or the CSV file to determine the properties associated with the building such as spaces, zones, rooms, suites, floors, or subsections/subsets/subdivision associated with the building. This may include living rooms, bedrooms, bathrooms, entryways, hallways, closets, and other structures and zones in buildings. Additionally, the floorplan module 206 may regularly determine whether each floorplan associated with each user is the most updated available version of the floorplan and if not, update the floorplan associated with each user.

The floorplan application 114 also may include an image module 208 that receives images associated with the building and the floorplan. As an example, the user may submit one or more images associated with the building such as photographs or videos from a camera device or imaging device. The camera device may be associated with the first client computing device 104 or may be a different hardware device.

The images may be street view images of the building or satellite view images of the building. The one or more images may also be three dimensional images that provide internal views of the building and the one or more spaces associated with the building. The one or more spaces may be interior/exterior parts of the building. As an example, the space may be a suite or floor in the building or may be a cubicle or office in the building.

The image module 208 may store the images associated with the building and the floorplan in the database 112. In addition, the user may submit additional information associated with the building and the floorplan such as a name of a person that lives/works in a particular space or room in the building, a name of the person that lives/works in the particular space or room in the building, and other information that may be useful for a first responder such as whether the person has any medical conditions or disadvantages. As an example, the person may have autism, the person may have diabetes, or the person may be blind. This additional information may be stored in the database 112 with the images and the floorplan.

Additionally, the image module 208 may regularly determine whether the images associated with each user are the most updated available images and if not, request that the user submit updated images associated with the building. In addition, the user may update the additional information associated with the building and floorplan. As an example, a person may move out of the building or the building may be physically modified and the additional information may have to be updated.

The floorplan application 114 also may include an emergency module 210. When an emergency occurs or a person needs immediate assistance, a person may utilize the first client computing device 104 or another device such as a telephone and contact emergency personnel. The person may dial 911 using the first client computing device 104 or the first client computing device 104 may send an emergency request from the first client computing device or a different device.

In one example, the user may use a client application component of the floorplan application 114 on the first client computing device 104 and submit the emergency request using the client application component of the floorplan application 114. The user may submit the emergency request by providing input to the client application component of the floorplan application.

The emergency module 210 may receive the emergency request from the first client computing device 104 that indicates that a first responder is to be dispatched to a particular physical address. The first responder selected to receive the emergency request may be the first responder that is located closest to the building when the emergency request is received, located in an area or associated with an organization assigned to provide emergency services for the location of the building, and/or may be the first responder best suited to respond to the emergency. In one example, the first client computing device may transmit a phone number associated with the first client computing device or another unique identifier. The server computing device 102 may query the database 112 to determine a particular floorplan associated with the physical address based on the phone number or the unique identifier. The server computing device 102 may transmit the floorplan associated with the particular physical address to a second client computing device 104 associated with a first responder. When the second client computing device 104 is connected to the communication network 106, the second client computing device may receive and store the floorplan in the memory 118 of the second client computing device 104.

Next, the emergency module 210 may request a confirmation of the emergency request from the first client computing device 104. In one example, the server computing device 102 may send a message to the first client computing device 104 and request a response to the message. The message may be a text message or alternatively may be a notification that is provided to the first client computing device 104. The server computing device 102 may receive the response to the message. When the emergency notification is confirmed by the user of the first client computing device, the first client computing device 104 and the second client computing device 104 continually provide handshake information and exchange information in realtime including a location of each client computing device, text messages, images including still images and video, and voice communication.

At this point, the first responder may be dispatched to the particular physical address to provide aid for the person that requested assistance. The emergency module 210 may determine that the second client computing device 104 is within a particular distance of the particular physical address and may display on a display 120 of the second client computing device 104 a location of the person in a particular space of the floorplan at the particular physical address. In some instances, the location of the person may also be provided by the first client computing device 104. For example, the second client computing device 104 may display a two-dimensional view of the floorplan of the building and a user interface element that indicates that the person is located in a second floor bedroom. The second client computing device 104 also may display the name of the person, an age of the person, a sex of the person, and other information such as medical conditions or disadvantages of the person. The other information may be an icon or a graphical user interface element such as a cross that indicates that the person has medical conditions that may require specific attention.

A user interface element representing the person may be overlaid on the floorplan at the location of the person. In addition, other information may also be overlaid on the floorplan such as the name of each room or space in the floorplan, a name of a person that lives in the room or space, an age of the person that lives in the room or space, and other information associated with the person that lives in the room or space such as a medical condition.

In a further example, the emergency module 210 may determine the location of the person in the particular space of the floorplan based on the at least one image of the building provided by the image module 208.

In addition, the floorplan application 114 includes a user interface module 212 for displaying a user interface on the display 120. As an example, the user interface module 212 generates a native and/or web-based graphical user interface (GUI) that accepts input and provides output viewed by users of the client computing device 104. The client computing device 104 may provide realtime automatically and dynamically refreshed floorplan information. The user interface module 212 may send data to other modules of the floorplan application 114 of the server computing device 102 and the client computing device 104, and retrieve data from other modules of the floorplan application of the server computing device 102 and the client computing device 104 asynchronously without interfering with the display and behavior of the user interface displayed by the server computing device 102 and the client computing device 104.

Figure 3:
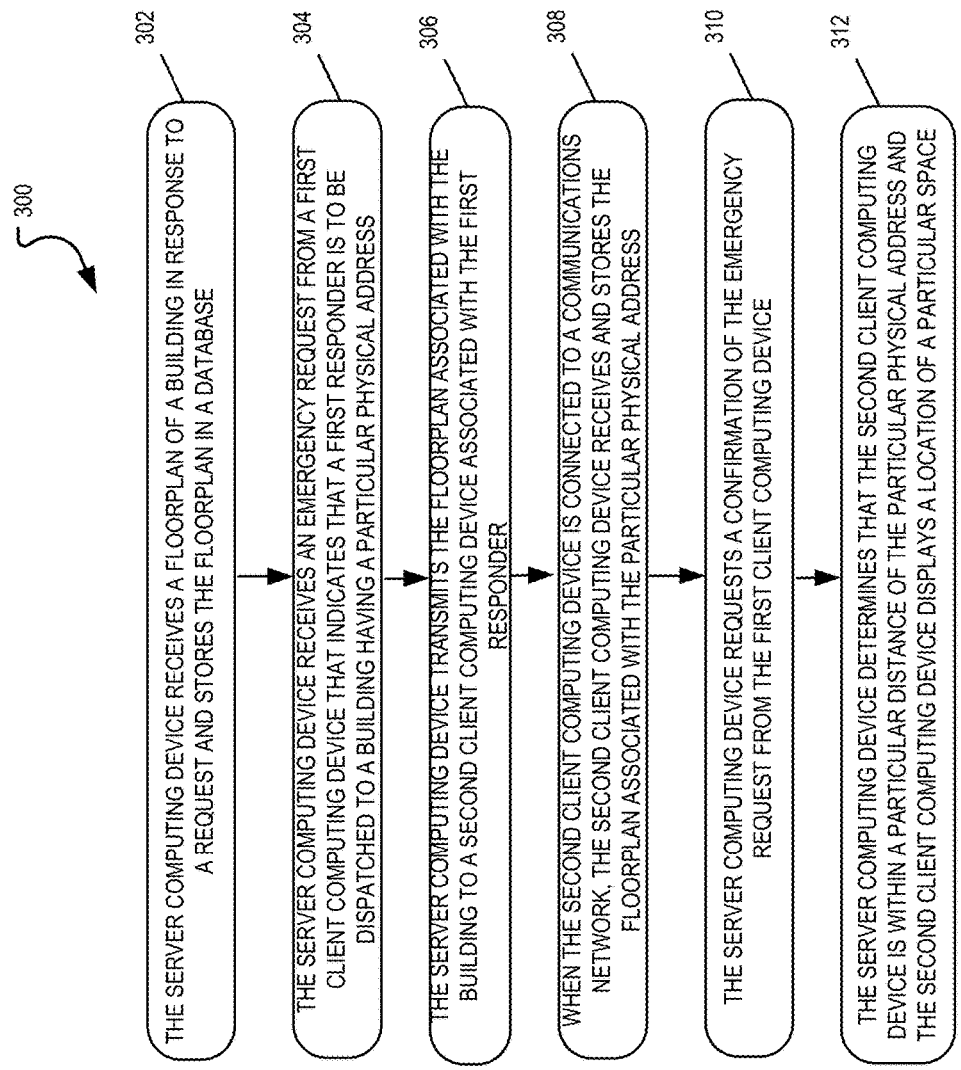
FIG. 3 illustrates a flowchart for transmitting a floorplan according to an example embodiment.

FIG. 3 illustrates a flowchart of a process 300 for transmitting a floorplan according to an example embodiment. In step 302, the server computing device 102 receives a floorplan of a building in response to a request from the first client computing device 104 or another computing device and stores the floorplan in the database 112. The request may be a request to create an account associated with the server computing device 102. The server computing device 102 may obtain the floorplan from another server computing device such as a server computing device provided by a municipality or a government, or another source.

Next, in step 304, the server computing device 102 may receive an emergency request from the first client computing device 104 that indicates that a first responder is to be dispatched to a particular physical address. The server computing device 102 may determine a floorplan associated with the first client computing device 104 based on a telephone number of the first client computing device (e.g., 111-222-3333) or a unique identifier associated with the computing device (e.g., ABCDE) and query the database 112 for the appropriate floorplan associated with the user submitting the emergency request.

Next, in step 306, the server computing device 102 may transmit the floorplan associated with the particular physical address to a second client computing device 104 associated with the first responder. The floorplan may include metadata and other information associated with the floorplan. As an example, the metadata may include information associated with each room of a building such as an occupant of each bedroom, an age of the occupant, and other information that may be useful for a first responder to know such as a medical condition of the occupant.

In step 308, when the second client computing device 104 is connected to the communications network 106, the second client computing device 104 receives the floorplan associated with the particular physical address from the server computing device 102 and may store the floorplan associated with the particular physical address in memory of the second client computing device 104. The second client computing device 104 may notify the server computing device that the floorplan is received from the server computing device 102.

In step 310, the server computing device 102 may request a confirmation of the emergency request from the first client computing device 104 and receive the confirmation of the emergency request from the first client computing device. At this point, the first client computing device 104 and the second client computing device 104 may communicate with one another in realtime and the second client computing device 104 may view messages and a location of the first client computing device 104. The first responder may travel from a first location such as a police station, a fire department, a hospital, or another location and arrive near a second location such as the particular physical address.

In step 312, the server computing device 102 may determine that the second client computing device 104 is within a particular distance of the particular physical address and the second client computing device may display on a display of the second computing device 104 a location of a person in a particular space of the floorplan at the particular physical address. The location of the person in the particular space of the floorplan at the particular physical address may be obtained from the first client computing device 104. As an example, the server computing device 102 may continually determine the location of the second client computing device 104 and the first client computing device 104 using the communication network 106. The floorplan as displayed on the second client computing device 104 also may provide information associated with one or more spaces of the floorplan such as one or more rooms if the building is a domicile such as a residence. Alternatively, the one or more spaces of the floorplan may be one or more suites associated with a commercial building or office.

Figure 4:
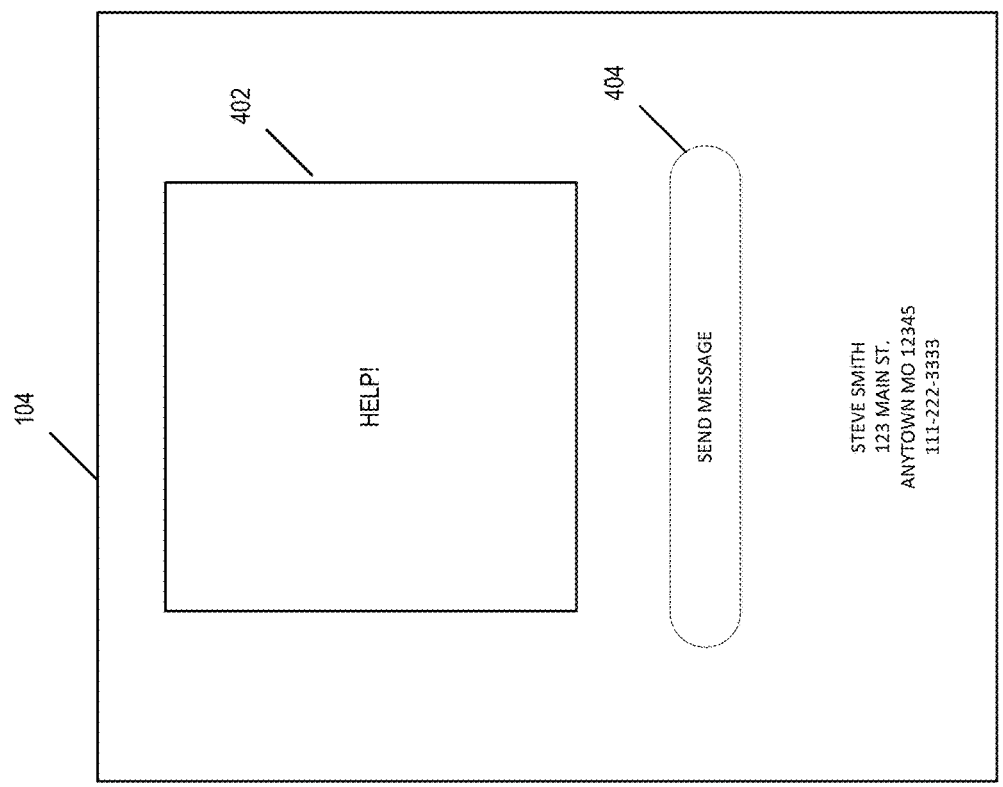
FIG. 4 shows an example user interface that may be displayed by a client computing device of the system according to an example embodiment.

FIG. 4 shows an example user interface that may be displayed by the first client computing device 104 of the system 100 according to an example embodiment. As shown in FIG. 4, if the user has an emergency and needs immediate assistance, the user may select a first button 402 to send an emergency notification to the server computing device 102. If the user would like to send a message to a first responder, the user may select a second button 404 to send a message. As an example, the message may be: "There is a trespasser outside of my home. Please send police." The message may be associated with the emergency notification and provided to the first responder automatically.

Figure 5:
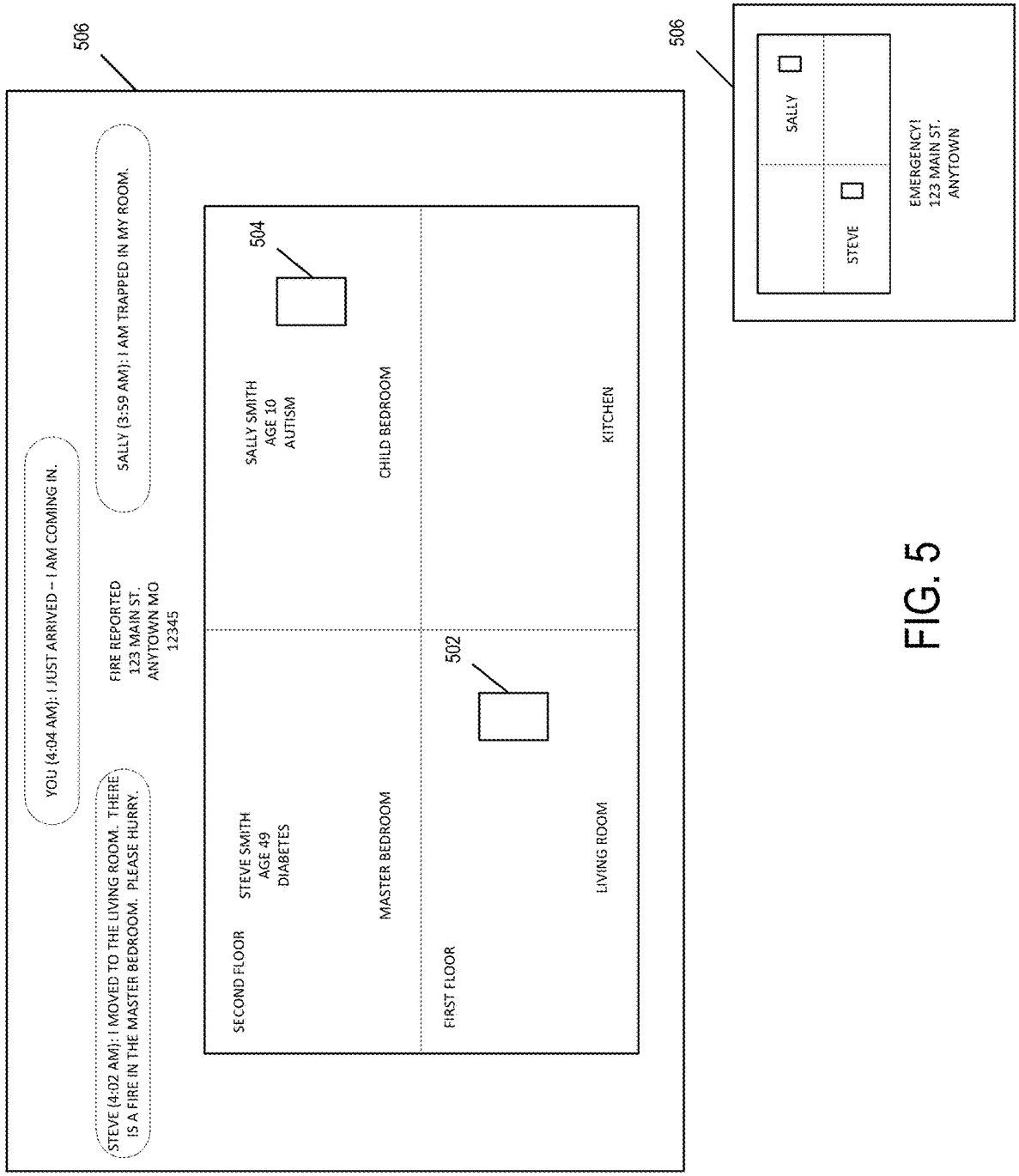
FIG. 5 shows an example user interface that may be displayed by a client computing device of the system according to an example embodiment.

FIG. 5 shows an example user interface that may be displayed by the second client computing device 104 of the system 100 according to an example embodiment. As shown in FIG. 5, when the second client computing device 506 is within a particular distance of the building, the second client computing device 506 may display a floorplan of the building in addition to metadata and other information associated with the building and occupants within the building. When the emergency notification is confirmed by the user of the first client computing device, the first client computing device and the second client computing device continually provide handshake information and exchange information in realtime including a location of each client computing device, text messages, images including still images and video, and voice communication.

As shown in FIG. 5, the building at 123 Main St. Anytown Mo. 12345 includes a second floor and a first floor. On the first floor, as shown in the floorplan there is a living room and a kitchen. On the second floor, as shown in the floorplan, there is a master bedroom and a child bedroom. The master bedroom includes additional information such as a name of an occupant, e.g., Steve Smith, an age, e.g., 49, and a medical condition, e.g., diabetes. The child bedroom includes additional information such as a name of an occupant, e.g., Sally Smith, an age, e.g., 10, and additional information that may be useful to a first responder, e.g., Sally has been diagnosed with autism. In addition, the system 100 may determine a location of a first client computing device associated with Steve 502 and a location of a second client computing device associated with Sally 504.

Also as shown in FIG. 5, the user of the second client computing device 506 may provide input to manipulate the user interface and zoom into or zoom out of the floorplan as displayed on the display 120. In one example, if the display is a touch screen, the user may pinch and zoom to transition from the first zoomed-out view to the second zoomed-in view. As shown in the bottom right corner of FIG. 5, less information may be provided by the user interface when zoomed further out. However, when the user of the second client computing device zooms into the user interface, the second client computing device 506 may provide additional detail.

The user of the second client computing device 104 also may transmit messages and communicate with the first client computing device 104 as shown in FIG. 5. Steve has sent a message that explains that he had to move from the master bedroom to the living room due to the fire at 123 Main St. Anytown Mo. Sally has sent a message that says that she is trapped in her room.

In addition, the location of the second client computing device 104 may be updated in realtime on the user interface of the first client computing device 104. As an example, Steve may have been located in the master bedroom when he transmitted the emergency notification to the server computing device 102 but may have had to locate to the living room due to smoke and flames. When the first responder arrives at the building, the first responder may view the user interface to understand that Steve's client computing device is located in the living room on the first floor.

Figure 6:
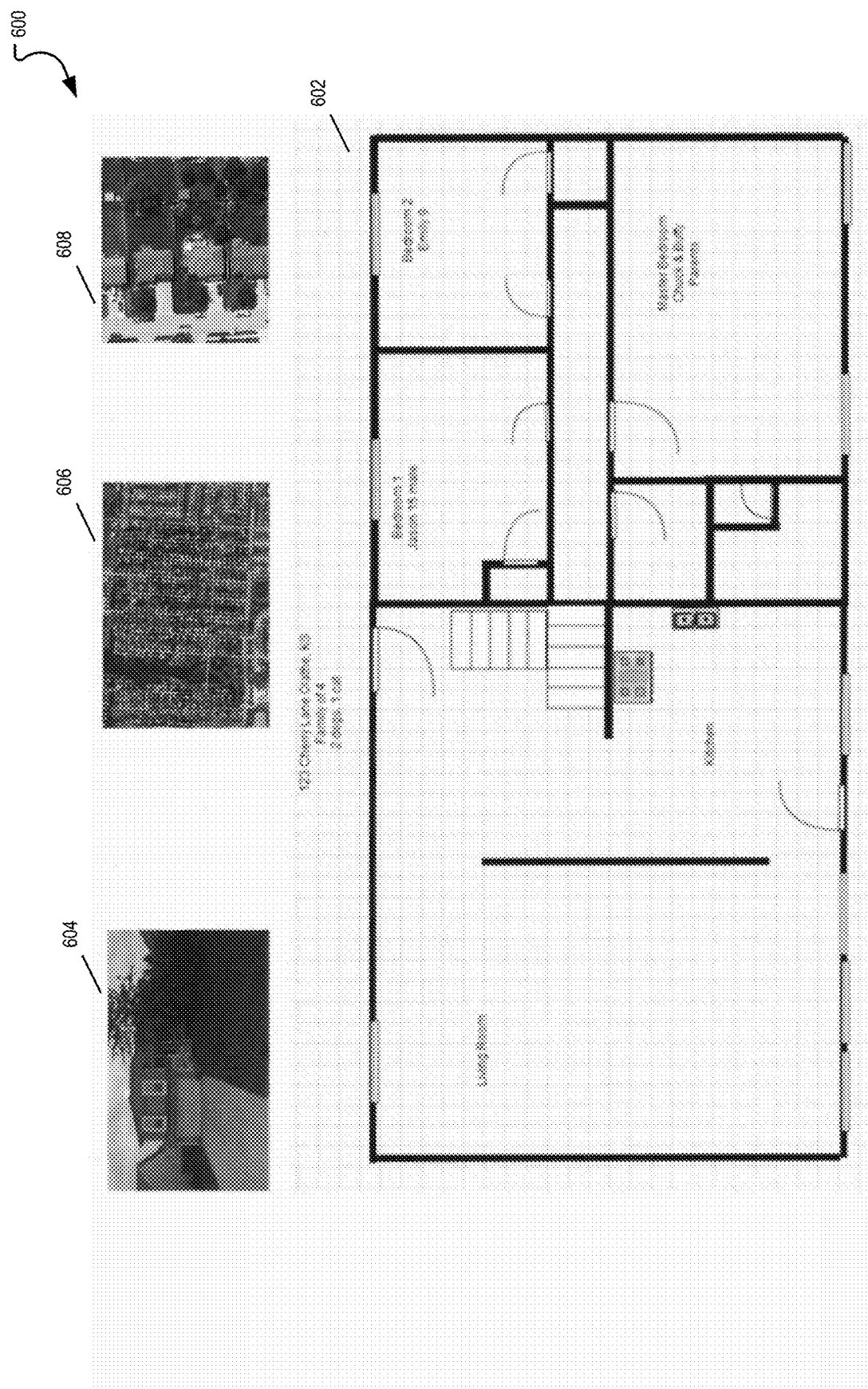
FIGS. 6-8 show example screenshots of an application of the system according to an example embodiment.
Figure 7:
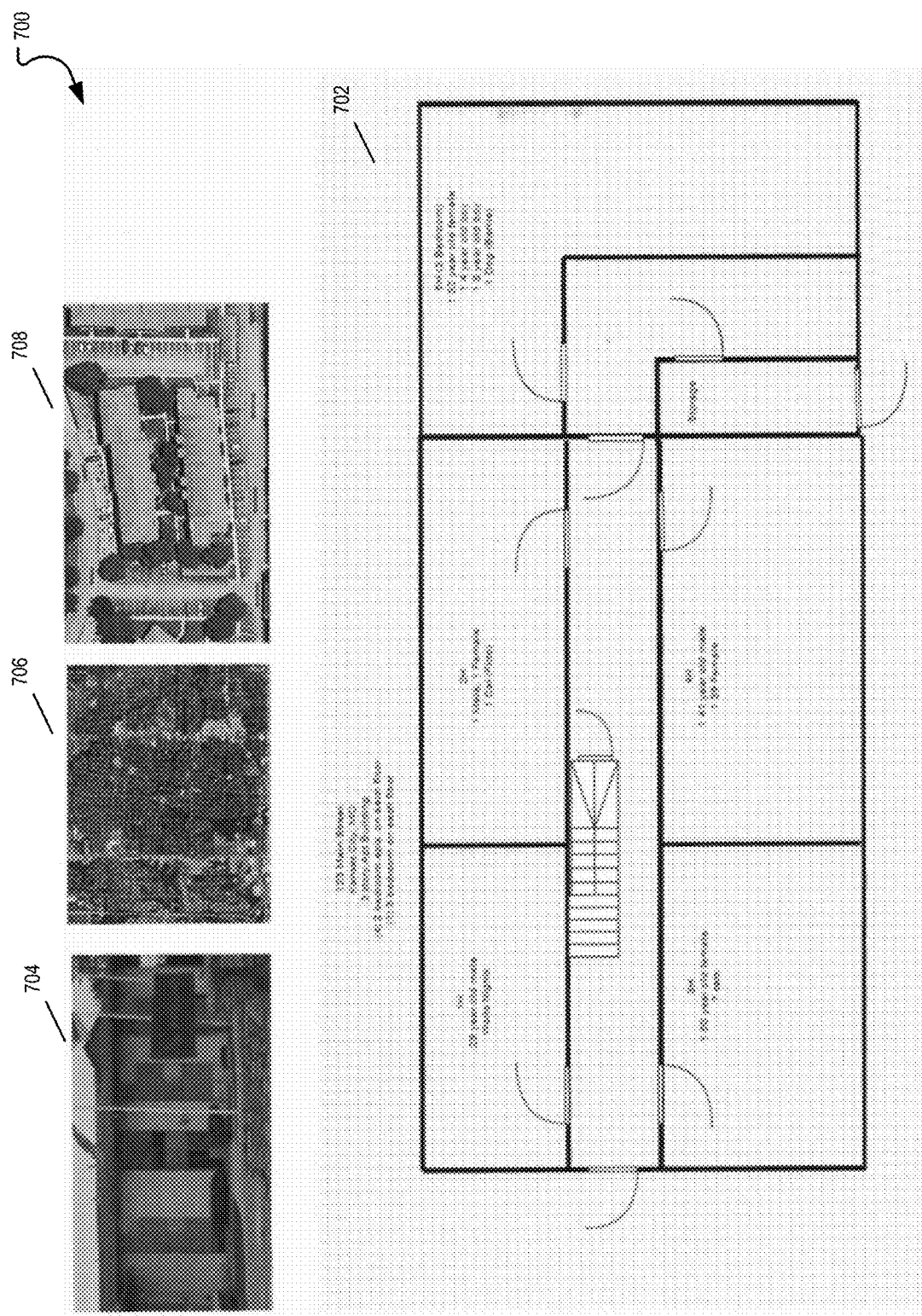
Figure 8:
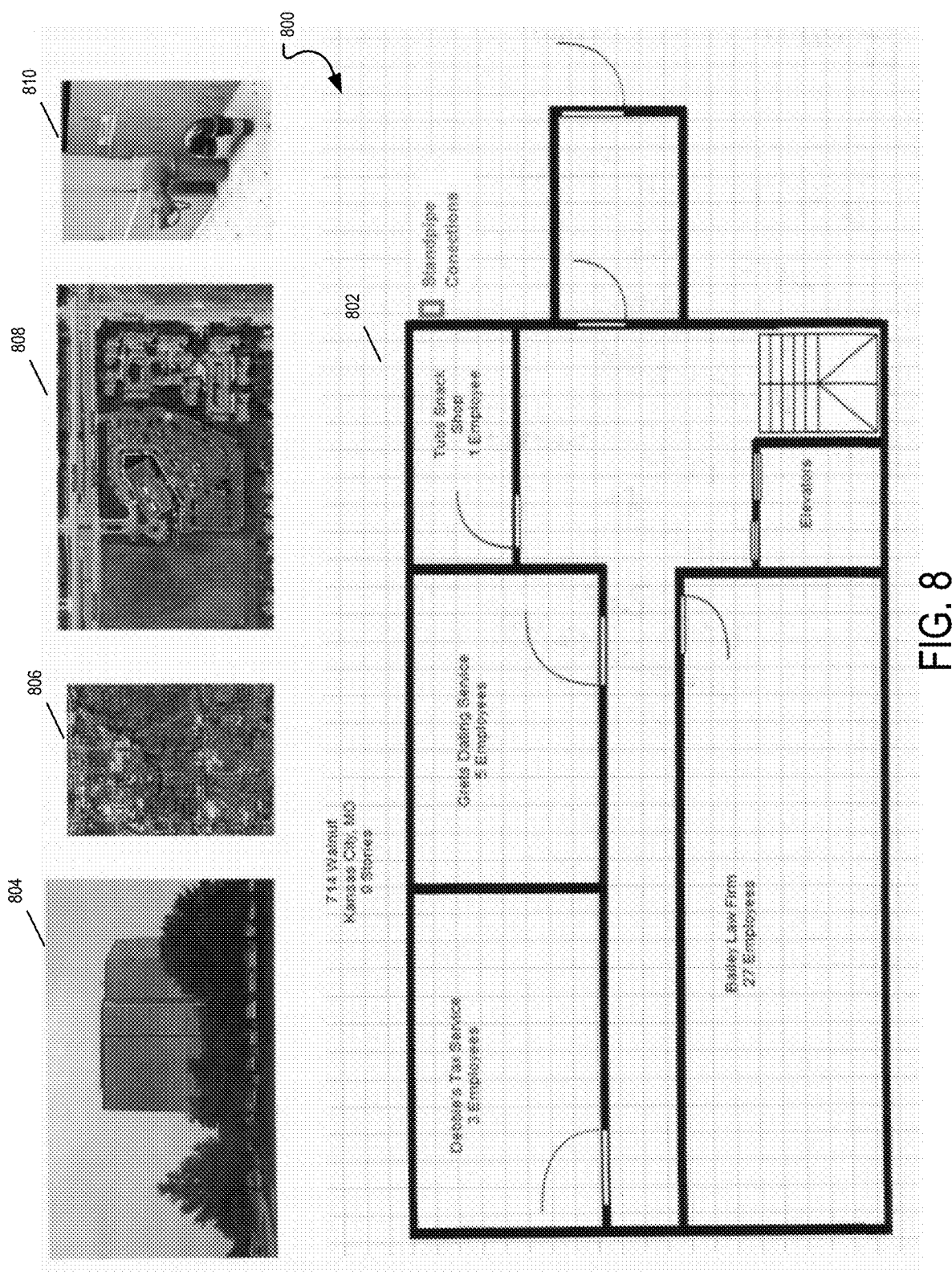

FIGS. 6, 7, and 8 show example screenshots 600, 700, and 800 provided by the floorplan application 114 according to an example embodiment.

FIG. 6 shows a screenshot 600 of a floorplan 602 of 123 Cherry Lane Olathe, Kans., which is the home of a family of four, two dogs, and one cat. As shown in the floorplan 602, there is a living room, a kitchen, a bedroom one, a bedroom two, and a master bedroom. Bedroom one houses Jason, a fifteen year old male. Bedroom two houses Emily, a nine year old female. The master bedroom houses Chuck and Buffy, parents of the children.

In addition, as shown in FIG. 6, there are three images associated with the floorplan of 123 Cherry Lane including a street view of the building 602, a first satellite view of the building 604, and a second satellite view of the building 606. As an example, these images may be transmitted with the floorplan to the first responder.

FIG. 7 shows a screenshot 700 of a floorplan 702 of 123 Main Street Kansas City Mo., which is a three story apartment building including four two bedroom apartments on each floor of the building, and one three bedroom apartment on each floor of the building. As shown in FIG. 7, apartment 1H houses a twenty-nine year old male that works nights. Apartment 2H houses one male, one female, and one cat named Fido.

Apartment 3H houses one sixty-year old female and seven cats. Apartment 4H houses one forty-one year old male and one thirty-nine year old female. Apartment 5H houses one thirty-two year old female, one four-year old boy, one eight-year old boy, and one dog named Barkie.

In addition, as shown in FIG. 7, there are three images associated with the floorplan of 123 Main Street including a street view of the building 704, a first satellite view of the building 706, and a second satellite view of the building 708. As an example, these images may be transmitted with the floorplan to the first responder.

FIG. 8 shows a screenshot 800 of a floorplan 802 of 714 Walnut Kansas City Mo., which is a nine-story commercial building. The floorplan 802 illustrates first floor of the building and each other floor may have its own floorplan similar to this one. A first suite houses Debbie's Tax Service including three employees. A second suite houses Gret's Dating Service including five employees. A third suite houses Tub's Snack Shop including one employee. A fifth suite houses Bailey Law Firm including twenty-seven employees.

In addition, as shown in FIG. 8, there are four images associated with the floorplan of 714 Walnut including a street view of the building 804, a first satellite view of the building 806, a second satellite view of the building 808, and an image of standpipe connections associated with the building 810. As an example, these images may be transmitted with the floorplan to the first responder.

Figure 9:
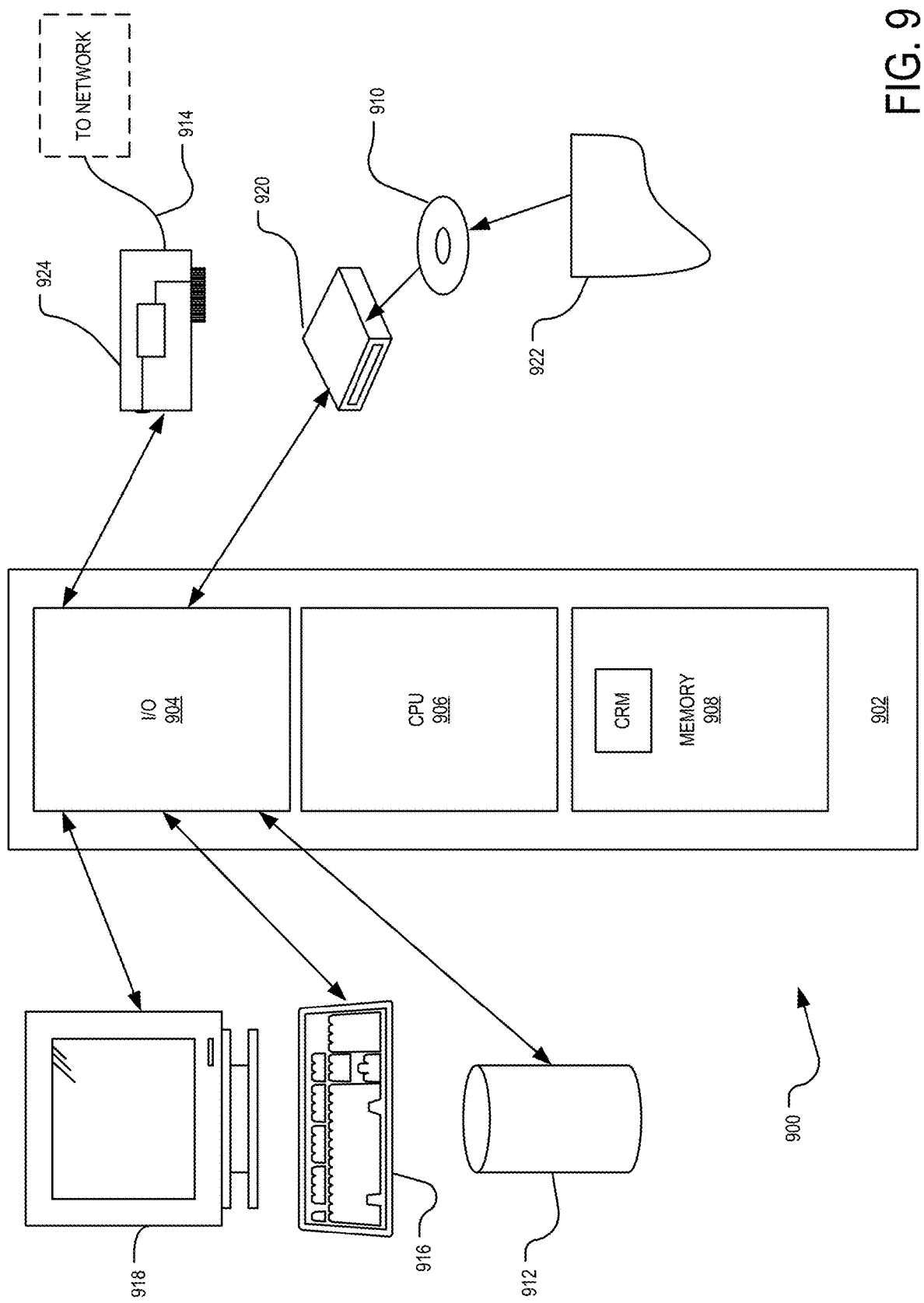
FIG. 9 illustrates a block diagram of a computing device according to an example embodiment.

FIG. 9 illustrates an example computing system 900 that may implement various systems, such as the server computing device 102 and the client computing device 104, and the methods discussed herein, such as process 300. A general purpose computer system 900 is capable of executing a computer program product to execute a computer process. Data and program files may be input to the computer system 900, which reads the files and executes the programs therein such as the floorplan application 114. Some of the elements of a general purpose computer system 900 are shown in FIG. 9 wherein a processor 902 is shown having an input/output (I/O) section 904, a central processing unit (CPU) 906, and a memory section 908. There may be one or more processors 902, such that the processor 902 of the computer system 900 comprises a single central-processing unit 906, or a plurality of processing units, commonly referred to as a parallel processing environment. The computer system 900 may be a conventional computer, a server, a distributed computer, or any other type of computer, such as one or more external computers made available via a cloud computing architecture. The presently described technology is optionally implemented in software devices loaded in memory 908, stored on a configured DVD/CD-ROM 910 or storage unit 912, and/or communicated via a wired or wireless network link 914, thereby transforming the computer system 900 in FIG. 9 to a special purpose machine for implementing the described operations.

The memory section 908 may be volatile media, nonvolatile media, removable media, non-removable media, and/or other media or mediums that can be accessed by a general purpose or special purpose computing device. For example, the memory section 908 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 904 is connected to one or more user-interface devices (e.g., a keyboard 916 and a display unit 918), a disc storage unit 912, and a disc drive unit 920. Generally, the disc drive unit 920 is a DVD/CD-ROM drive unit capable of reading the DVD/CD-ROM medium 910, which typically contains programs and data 922. Computer program products containing mechanisms to effectuate the systems and methods in accordance with the presently described technology may reside in the memory section 904, on a disc storage unit 912, on the DVD/CD-ROM medium 910 of the computer system 900, or on external storage devices made available via a cloud computing architecture with such computer program products, including one or more database management products, web server products, application server products, and/or other additional software components. Alternatively, a disc drive unit 920 may be replaced or supplemented by a tape drive unit, or other storage medium drive unit. The network adapter 924 is capable of connecting the computer system 900 to a network via the network link 914, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 900 is connected (by wired connection and/or wirelessly) to a local network through the network interface or adapter 924, which is one type of communications device. When used in a WAN-networking environment, the computer system 900 typically includes a modem, a network adapter, or any other type of communications device for establishing communications over the wide area network. In a networked environment, program modules depicted relative to the computer system 900 or portions thereof, may be stored in a remote memory storage device. It is appreciated that the network connections shown are examples of communications devices for and other means of establishing a communications link between the computers may be used.

In an example implementation, source code executed by the server computing device 102 or the client computing device 104, a plurality of internal and external databases, source databases, and/or cached data on servers are stored in the database 112, memory 110 of the server computing device 102, memory 118 of the client computing device 104, or other storage systems, such as the disk storage unit 912 or the DVD/CD-ROM medium 910, and/or other external storage devices made available and accessible via a network architecture. The source code executed by the server computing device 102 and the client computing device 104 may be embodied by instructions stored on such storage systems and executed by the processor 902.

Some or all of the operations described herein may be performed by the processor 902, which is hardware. Further, local computing systems, remote data sources and/or services, and other associated logic represent firmware, hardware, and/or software configured to control operations of the system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 902 and a user may interact with a Graphical User Interface (GUI) using one or more user-interface devices (e.g., the keyboard 916, the display unit 918, and the user devices 904) with some of the data in use directly coming from online sources and data stores. The system set forth in FIG. 9 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to execute instructions stored in the memory to perform operations comprising:
receiving a floorplan of a building and storing the floorplan in a database;
receiving an emergency request from a first client computing device that indicates that a first responder is to be dispatched to a particular physical address associated with the building;
determining the floorplan associated with the particular physical address based on a telephone number associated with the first client computing device;
transmitting the floorplan associated with the particular physical address to a second client computing device associated with the first responder;
when the second client computing device is connected to a communication network, receiving a notification that the floorplan associated with the particular physical address is stored in memory of the second client computing device;
requesting a confirmation of the emergency request from the first client computing device and receiving the confirmation of the emergency request from the first client computing device; and
determining that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

2. The system of claim 1, the operations further comprising:
receiving at least one image of the building and storing the at least one image of the building in the database; and
determining the location of the person in the particular space of the floorplan based on the at least one image of the building.

3. The system of claim 1, the operations further comprising:
receiving from the first client computing device, building data associated with the building comprising at least one of an occupant of the building, a name of the occupant of the building, an age of the occupant of the building, and a room of the occupant of the building;
storing the building data with the floorplan of the building in the database; and
determining the location of the person in the particular space of the floorplan based on the building data.

4. The system of claim 1, the operations further comprising:
storing the floorplan associated with the particular physical address in memory of the second computing device; and
when the second computing device is disconnected from the communication network and within the particular distance from the particular physical address, displaying on the display of the second computing device the location of the person in the particular space of the floorplan at the particular physical address.

5. The system of claim 1, wherein the second computing device is associated with one of a police department, a fire department, and a hospital and the building is one of a residential domicile, an industrial building, and a commercial building.

6. The system of claim 1, the operations further comprising retrieving the floorplan of the building from a server computing device.

7. A method comprising:
receiving, by at least one processor, a floorplan of a building and storing the floorplan in a database;
receiving, by the at least one processor, an emergency request from a first client computing device that indicates that a first responder is to be dispatched to a particular physical address associated with the building;
determining, by the at least one processor, the floorplan associated with the particular physical address based on a telephone number associated with the first client computing device;
transmitting, by the at least one processor, the floorplan associated with the particular physical address to a second client computing device associated with the first responder;
when the second client computing device is connected to a communication network, receiving, by the at least one processor, a notification that the floorplan associated with the particular physical address is stored in memory of the second client computing device;
requesting, by the at least one processor, a confirmation of the emergency request from the first client computing device and receiving the confirmation of the emergency request from the first client computing device; and
determining, by the at least one processor, that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

8. The method of claim 7, further comprising:
receiving at least one image of the building and storing the at least one image of the building in the database; and
determining the location of the person in the particular space of the floorplan based on the at least one image of the building.

9. The method of claim 7, further comprising:
receiving from the first client computing device, building data associated with the building comprising at least one of an occupant of the building, a name of the occupant of the building, an age of the occupant of the building, and a room of the occupant of the building;
storing the building data with the floorplan of the building in the database; and
determining the location of the person in the particular space of the floorplan based on the building data.

10. The method of claim 7, further comprising:
storing the floorplan associated with the particular physical address in memory of the second computing device; and
when the second computing device is disconnected from the communication network and within the particular distance from the particular physical address, displaying on the display of the second computing device the location of the person in the particular space of the floorplan at the particular physical address.

11. The method of claim 7, wherein the second computing device is associated with one of a police department, a fire department, and a hospital and the building is one of a residential domicile, an industrial building, and a commercial building.

12. The method of claim 7, further comprising retrieving the floorplan of the building from a server computing device.

13. A non-transitory computer-readable storage medium, having instructions stored thereon that, when executed by a computing device cause the computing device to perform operations, the operations comprising:
receiving a floorplan of a building and storing the floorplan in a database;
receiving an emergency request from a first client computing device that indicates that a first responder is to be dispatched to a particular physical address associated with the building;
determining the floorplan associated with the particular physical address based on a telephone number associated with the first client computing device;
transmitting the floorplan associated with the particular physical address to a second client computing device associated with the first responder;
when the second client computing device is connected to a communication network, receiving, by the at least one processor, a notification that the floorplan associated with the particular physical address is stored in memory of the second client computing device;
requesting a confirmation of the emergency request from the first client computing device and receiving the confirmation of the emergency request from the first client computing device; and
determining that the second computing device is within a particular distance from the particular physical address and displaying on a display of the second client computing device a location of a person in a particular space of the floorplan at the particular physical address, the location of the person in the particular space of the floorplan at the particular physical address obtained from the first client computing device.

14. The non-transitory computer-readable storage medium of claim 13, the operations further comprising:
receiving at least one image of the building and storing the at least one image of the building in the database; and
determining the location of the person in the particular space of the floorplan based on the at least one image of the building.

15. The non-transitory computer-readable storage medium of claim 13, the operations further comprising:
receiving from the first client computing device, building data associated with the building comprising at least one of an occupant of the building, a name of the occupant of the building, an age of the occupant of the building, and a room of the occupant of the building;
storing the building data with the floorplan of the building in the database; and
determining the location of the person in the particular space of the floorplan based on the building data.

16. The non-transitory computer-readable storage medium of claim 13, the operations further comprising:

storing the floorplan associated with the particular physical address in memory of the second client computing device; and when the second computing device is disconnected from the communication network and within the particular distance from the particular physical address, displaying on the display of the second computing device the location of the person in the particular space of the floorplan at the particular physical address.

17. The non-transitory computer-readable storage medium of claim 13, the operations further comprising, wherein the second computing device is associated with one of a police department, a fire department, and a hospital and the building is one of a residential domicile, an industrial building, and a commercial building.

* * * * *